US009844821B2

(12) United States Patent
Donadini et al.

(10) Patent No.: US 9,844,821 B2
(45) Date of Patent: Dec. 19, 2017

(54) CLAMP FOR A KEY DUPLICATING MACHINE

(71) Applicant: SILCA S.P.A., Vittorio Veneto (IT)

(72) Inventors: Michele Donadini, Ponzano Veneto (IT); Giorgio Pigatti, Vittorio Veneto (IT)

(*) Notice: Subject to any disclaimer, the term of this patent is extended or adjusted under 35 U.S.C. 154(b) by 99 days.

(21) Appl. No.: 14/902,449

(22) PCT Filed: Jul. 21, 2014

(86) PCT No.: PCT/EP2014/065634
§ 371 (c)(1),
(2) Date: Dec. 31, 2015

(87) PCT Pub. No.: WO2015/011095
PCT Pub. Date: Jan. 29, 2015

(65) Prior Publication Data
US 2016/0375505 A1  Dec. 29, 2016

(30) Foreign Application Priority Data
Jul. 24, 2013 (IT) .............................. VE2013A0039

(51) Int. Cl.
*B23Q 3/00* (2006.01)
*B23C 3/35* (2006.01)
(52) U.S. Cl.
CPC .......... *B23C 3/355* (2013.01); *B23C 2270/08* (2013.01)
(58) Field of Classification Search
USPC ....... 269/9, 157, 240, 257, 285; 409/81, 225
See application file for complete search history.

(56) References Cited

U.S. PATENT DOCUMENTS

| 2,282,165 A | | 5/1942 | Corson et al. | |
| 5,800,231 A | * | 9/1998 | De Haas | B24C 1/04 445/24 |
| 9,586,273 B2 | * | 3/2017 | Cox | B23C 3/355 |
| 2002/0182022 A1 | * | 12/2002 | Chies | B23C 3/355 409/81 |
| 2010/0059916 A1 | * | 3/2010 | Pigatti | B23C 3/355 269/157 |

FOREIGN PATENT DOCUMENTS

| GB | 903737 A | 8/1962 |
| WO | WO2005039810 A1 | 5/2005 |
| WO | WO2008006552 | 1/2008 |

* cited by examiner

*Primary Examiner* — Joseph J Hail
*Assistant Examiner* — Shantese McDonald
(74) *Attorney, Agent, or Firm* — Themis Law

(57) ABSTRACT

A clamp for key duplicating machines includes a support, a pin emerging therefrom with a threaded upper end engagable by a knob, the support base having a pair of upper parallel projections on opposite sides of the pin, a lower jaw of square plan, positioned on the support and having a central hole rotatably engaged by the pin, with four grooves in its lower surface parallel to the jaw sides and engagable in pairs with the projections, an upper jaw of square plan, having a central hole rotatably engaged by the pin and cooperating with the lower jaw to clamp a key, wherein the pair of projections are shaped as parallel cylindrical pegs emerging from the upper surface of the support. When the clamp is active, its lower jaw rests only by two grooves on the two projections, otherwise the lower surface is spaced from the support upper surface.

5 Claims, 2 Drawing Sheets

CLAMP FOR A KEY DUPLICATING MACHINE

FIELD OF THE INVENTION

The present invention relates to an improved clamp for a key duplicating machine.

BACKGROUND OF THE INVENTION

Key duplicating machines for flat keys with lateral bitting are known. They are usually provided with two clamps, one facing a mechanical feeler and intended to clamp the original key to be duplicated, and one facing the milling cutter and intended to clamp the blank key to be bitted. To achieve correct reproduction of the bitting pattern on the blank key, the original key and the blank key, and hence the respective clamps, must be precisely aligned longitudinally.

In particular, clamps are known with two superposed jaws of square plan and with their facing surfaces suitably shaped to be able to retain between them keys of different shapes. In particular, to securely retain a key, the clamp jaws present ribs designed to penetrate into the longitudinal grooves generally present in the key shank.

To overcome the fact that keys present profiles of many shapes, all mutually different, the jaws are formed such as to present a different shape on each of its faces, such that by suitably choosing and positioning the two jaws facing the milling cutter and feeler, the same clamp can be adapted to several different key profiles.

In greater detail, according to the traditional art, the clamp jaws are mounted on a vertical pin fixed to a support mounted on a structure movable in the machine directions X and Y relative to its base, to which the milling cutter and feeler are fixed; in particular, the jaws are mounted on said pin such as to enable each jaw to be rotated about the other and about their support. Correct positioning of the clamp lower jaw relative to its support is generally achieved by vertical pegs rigid with the support and engaging in corresponding holes provided in the lower jaw. The drawback of this solution is that the jaw is rather laborious to construct and is difficult to engagement on the support pegs.

A solution has been proposed involving the presence of a rocker plate positioned on the face of the lower jaw opposite the clamping face and acting such as to urge the jaw against the vertical pin, to which it is connected together with the upper jaw. This solution enables inevitable slack and manufacturing tolerances to be eliminated and ensures that the jaws are disposed with their surfaces always perfectly perpendicular to the milling cutter and feeler axes for any position into which they are rotated about their support. However, apart from the laborious construction of this solution, it requires the use of both hands to rotate the jaw, one hand being used to raise and reposition the jaws, while the other operates the rocker plate.

U.S. Pat. No. 2,282,165 relates to a key duplicating machine in which the base of the lower jaw, of square plan, is provided with grooves which extend cross-shaped from a central hole and are intended to come into contact with projections, also of cross-shape, defined on the upper surface of the clamp support. In particular, the lower jaw can be locked in each of the four angular operative positions by simply rotating the jaw such that its grooves engage different projections on the support.

SUMMARY OF THE INVENTION

An object of the invention is to eliminate these drawbacks by providing an improved clamp which ensures correct, quick and precise key clamping and positioning.

Another object of the invention is to provide an improved clamp of simple and rapid construction at low production cost.

BRIEF DESCRIPTION OF THE DRAWINGS

These and other objects which will be apparent from the ensuing description are attained, according to the invention, by an improved clamp in accordance with claim 1.

The present invention is further clarified hereinafter with reference to the accompanying drawings, in which.

DETAILED DESCRIPTION OF EMBODIMENTS OF THE INVENTION

Figure 1:
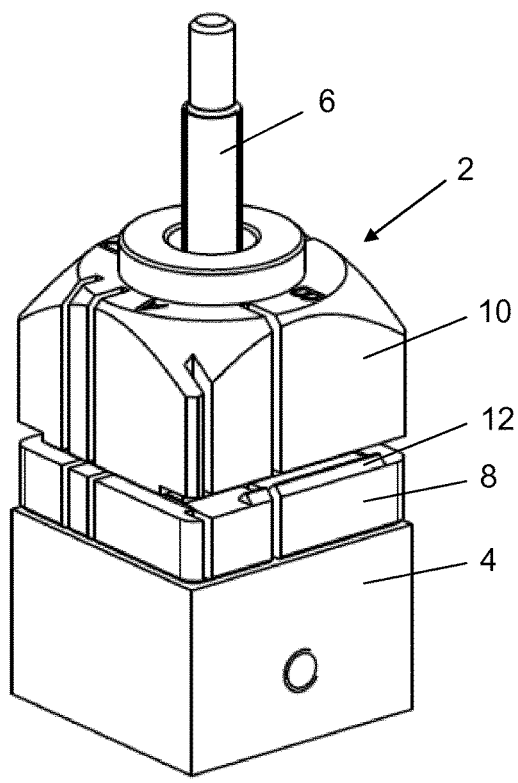
FIG. 1 is a perspective view of an improved clamp according to the invention.
Figure 2:
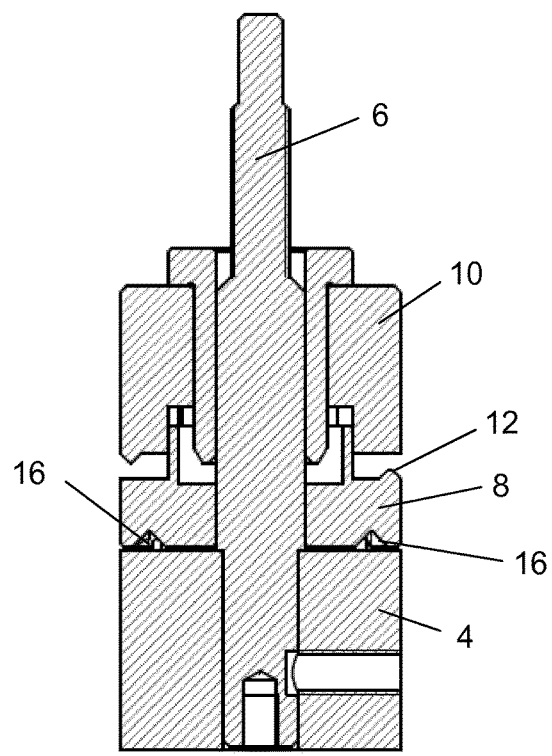
FIG. 2 shows it in vertical section on the line II-II of FIG. 5.
Figure 3:
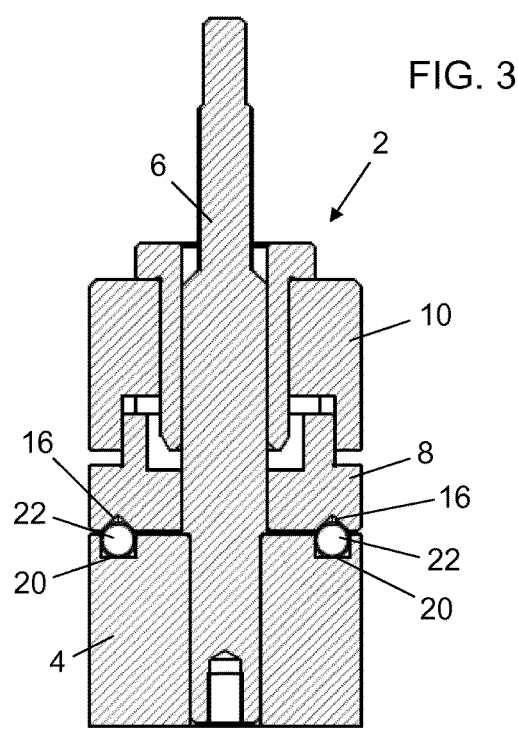
FIG. 3 shows it in vertical section on the line III-III of FIG. 5.

As can be seen from the figures, the improved clamp 2 according to the invention comprises a support 4 with two superposed jaws 8, 10 mounted on a pin 6 fixed to said support.

The two jaws 8, 10 are of square plan with their facing surfaces differently shaped such as to be able to retain between them keys of different profiles.

More particularly, the facing surfaces of the two jaws 8, 10 are flat or are provided with ribs 12 complementary to the longitudinal grooves usually present in the shank of the key to be retained between the jaws. Suitably, the support 4 is also of square plan with its sides substantially of the same dimensions as those of the jaws 8, 10.

Advantageously, the upper portion of the pin 6 is threaded and engages in a corresponding thread provided in a knob, not represented, the purpose of which is to lock the two jaws 8, 10 to the support 4 by a single operation, against the reaction of a spring interposed therebetween.

The lower surface 14 of the lower jaw 8 is provided with four grooves 16 of essentially V-profile. These are parallel to the jaw sides and are positioned at the same distance from them.

Figure 4:
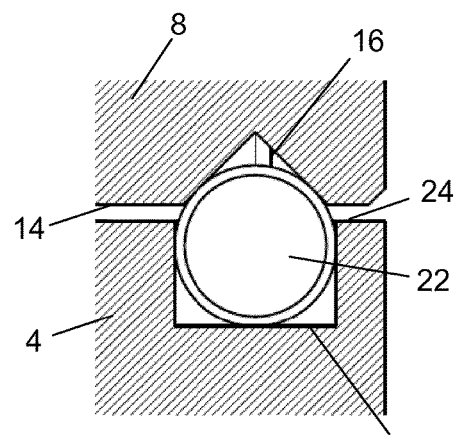
FIG. 4 shows an enlarged detail of FIG. 3.
Figure 5:
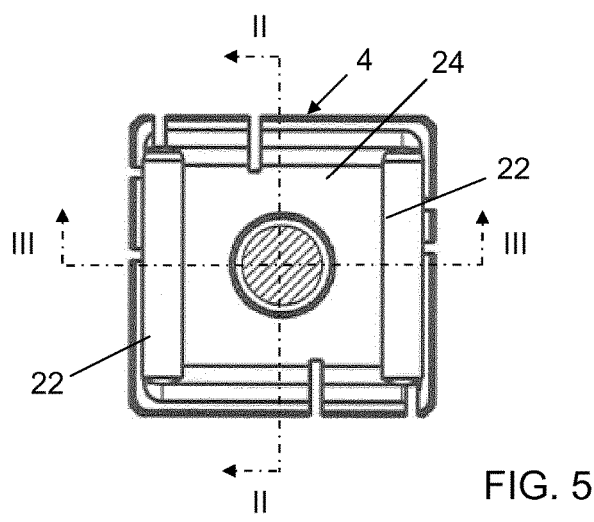
FIG. 5 shows a plan view of the support base of the clamp of FIG. 1, but without the two jaws.

On the support 4, on opposite sides of the pin 6, two mutually parallel depressed seats 20 are defined housing two cylindrical pegs 22. In greater detail, the pegs 22 project beyond the upper surface 24 of the support base 4 such as to cooperate with two opposing inverted V-shaped grooves 16 provided in the lower jaw 8. As shown in FIG. 4, the pegs 22 of the support 4 and the grooves 16 are shaped such that, on mutual cooperation, that part of the lower surface 14 of the lower jaw 8 not provided with said V-shaped grooves is raised from the opposing upper surface 24 of the support 4.

Evidently, when the angular position of the lower jaw 8 relative to the support base 4 varies, the two inverted V-shaped grooves 16 engaged by the two pegs 22 vary.

The operation of the improved clamp 2 according to the invention is apparent from the description. In particular, when the user wishes to bring a certain pair of jaws to face the tool and the feeler, he firstly loosens their connection by operating the knob which retains them clamped, in this manner causing them to move apart, then raises them until they disengage the grooves 16 of the lower jaw 8 from the two pegs 22. He then rotates the two jaws 8, 10 about the support base 4 and about each other until the chosen pair faces the tool or feeler, then after placing the key between them, he clamps it in position by operating the knob. Correct and stable positioning of the lower jaw 8 relative to the support base 4 is ensured by the engagement of the two pegs 22 in the two grooves 16, which in this position are located above the pegs 22 and which, by virtue of their shape, immediately ensure the precision of this engagement.

From the aforegoing it is apparent that the improved clamp according to the invention is much more advantageous than traditional clamps, in that:

it is easier to construct, it renders the production, machining and inspection stages of the two jaws similar, enabling rationalization and simplification of the production process, with consequent cost saving, it enables easy, quick and precise jaw positioning, enables this positioning to be achieved with a single hand.

The invention claimed is:

1. A clamp (2) for key duplicating machines, comprising:
    a support (4) connected to an underlying structure of a key duplicating machine;
    a pin (6) emerging upwards from said support (4) and having its upper end threaded and engagable by a clamping knob, a base of said support (4) presenting on its upper surface (24) a pair of parallel projections (22) positioned on opposite sides of said pin (6);
    a lower jaw (8) of square plan, positioned on said support (4) and having a central hole thereof engaged by said pin (6) such as to be able to rotate about an axis thereof, said lower jaw (8) being provided in its lower surface (14) with four grooves (16) disposed parallel to jaw sides and engagable in pairs with said projections (22) for each of four angular positions of said lower jaw (8) rotated 90° apart about the axis of said pin (6); and
    an upper jaw (10) of square plan, having a central hole thereof engaged by said pin (6) such as to be able to rotate about the axis thereof, said upper jaw (10) cooperating with the lower jaw (8) to clamp a key interposed between the lower and upper jaws, wherein:

said pair of projections is are shaped as cylindrical pegs (22) housed in depressed parallel seats (20) defined in the upper surface (24) of the support (4) such that at least one portion of each peg emerges from the upper surface (24) of the support, and when the clamp (2) is active, its lower jaw (8) rests only by two of the four grooves (16) on the two projections (22) of the support (4), while for a remaining part, the lower surface (14) is spaced from the upper surface (24) of the support (4).

2. The clamp as claimed in claim 1, wherein said four grooves (16) are of inverted V-shaped profile.

3. The clamp as claimed in claim 1, wherein facing surfaces of the lower and upper jaws (8, 10) are provided with ribs (12) complementary to longitudinal cuts present in the key to be clamped between the lower and upper jaws.

4. The clamp as claimed in claim 1, wherein the support (4) is of square plan with dimensions corresponding to dimensions of the lower and upper jaws (8, 10).

5. The clamp as claimed in claim 1, wherein said knob is arranged to act, against a reaction of a spring interposed between the lower and upper jaws (8, 10), to lock the lower and upper jaws (8, 10) together and to the support (4).

\* \* \* \* \*